UNITED STATES PATENT OFFICE.

IENS P. LIHME, OF CLEVELAND, OHIO, ASSIGNOR TO THE GRASSELLI CHEMICAL COMPANY, OF SAME PLACE.

PROCESS OF MAKING SODIUM SULFID AND LITHOPONE.

SPECIFICATION forming part of Letters Patent No. 680,603, dated August 13, 1901.

Application filed November 21, 1900. Serial No. 37,237. (No specimens.)

*To all whom it may concern:*

Be it known that I, IENS P. LIHME, a citizen of the United States of America, and a resident of the city of Cleveland, county of Cuyahoga, and State of Ohio, have invented certain new and useful Improvements in the Process of Manufacturing Sodium Sulfid, of which the following is a specification.

My invention relates to an improved process for manufacturing sodium sulfid and lithopone at one operation, and has for its object the provision of a cheaper and more advantageous commercial method for preparing said products which will as well insure their purity.

Hitherto the method pursued in the manufacture of sodium sulfid commercially has involved calcining sodium sulfate with coal or other forms of carbon to produce carbon dioxid and sodium sulfid. This latter product, however, has commonly been found to contain various impurities, which cannot well be avoided by reason of the nature of the process.

My improved process contemplates the manufacture of sodium sulfid in solution together with the formation and precipitation of lithopone. The latter, it may be remarked, is a white powder quite commonly used of late years in the manufacture of paints and is formed of a mixture of zinc sulfid and barium sulfate. The standard grade of lithopone contains 29.4 per cent. of zinc sulfid, and heretofore it has been the most common commercial practice to manufacture lithopone of various grades by mechanically mixing the several powdered ingredients in accordance with the grade desired. The present process, however, looks to the production of lithopone of various grades concurrently with the formation in a wet process of sodium sulfid.

The process of my invention, which avoids the calcining previously required, secures products of extreme purity, which, respectively, being readily soluble and insoluble in water, are advantageously formed in one process and may be easily recovered from the solution. In its preferred form my process consists in preparing separate solutions of zinc sulfate, barium sulfid, and sodium sulfate in amounts proportionate to their molecular weights or multiples thereof calculated to produce the quantity of sodium sulfid and the grade of lithopone desired. Thus to prepare nine hundred and sixty pounds of sodium sulfid and a 7.68 per cent. grade lithopone separate solutions containing one hundred and sixty-one pounds of zinc sulfate, eight hundred and forty-five pounds of barium sulfid, and five hundred and sixty-eight pounds of sodium sulfate are prepared, which are then united and immediately cause the precipitation of the lithopone according to the following reaction:

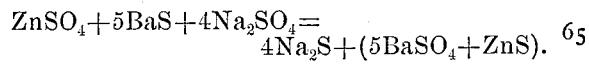
$$ZnSO_4 + 5BaS + 4Na_2SO_4 = 4Na_2S + (5BaSO_4 + ZnS).$$

The twelve hundred and sixty-two pounds of lithopone, containing 7.68 per cent. of zinc sulfid, is then filtered out from the solution and the sodium sulfid remaining in the solution may be recovered by any suitable evaporating process, which, crystallizing with nine parts of water, will form nine hundred and sixty pounds of sodium sulfid.

Should a higher grade of lithopone be desired—as, for example, one containing 23.7 per cent. of zinc sulfid—the solutions may be made containing, respectively, four hundred and thirty-eight pounds of zinc sulfate, nine hundred and thirty-two pounds of barium sulfid, and one hundred and forty-two pounds of sodium sulfate, which, combining in accordance with the following reaction:

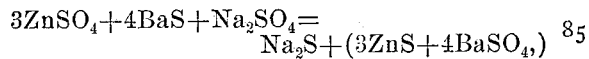
$$3ZnSO_4 + 4BaS + Na_2SO_4 = Na_2S + (3ZnS + 4BaSO_4,)$$

will yield twelve hundred and twenty-three pounds of lithopone of the 23.7 per cent. grade and seventy-eight pounds of sodium sulfid. This latter, combining with nine parts of water, will produce two hundred and forty pounds of sodium-sulfid crystals.

It will readily be appreciated that my improved process for the manufacture of sodium sulfid and lithopone of various grades is much more desirable than those hitherto practiced commercially, since by a single step the two products are produced, and by observing the ordinary precautions in selecting the ingredients both of said products are insured in their purest form.

I am aware that the precipitation of the standard grade of lithopone from a solution and the production of sodium sulfid in solution have been separately suggested. I believe, however, that I am the first to devise a practicable commercial method for producing in solution and by a single operation sodium sulfid and as a by-product lithopone of various grades whereby the cost of production is very materially decreased. Those skilled in the art will appreciate the manner in which these reactions may be varied to produce other percentages of sodium sulfid and lithopone of other grades.

Having therefore described and illustrated the manner in which my invention may be practiced, I claim as new, and desire to secure by these Letters Patent, the following:

The process of making sodium sulfid and lithopone, which consists in bringing together solutions of zinc sulfate, barium sulfid and sodium sulfate, in suitable proportions to precipitate lithopone and produce sodium sulfid in solution, substantially as described.

Signed at Cleveland this 13th day of November, 1900.

IENS P. LIHME.

Witnesses:
  JOHN HART,
  ALBERT LYNN LAWRENCE.